(12) United States Patent
Rademacher et al.

(10) Patent No.: US 8,644,989 B2
(45) Date of Patent: Feb. 4, 2014

(54) METHOD AND SYSTEM FOR APPLYING A COATING MATERIAL USING A PROGRAMMABLE ROBOT

(75) Inventors: Lothar Rademacher, Bietigheim-Biggingen (DE); Martin Wolf, Kerchberg an der Murr (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 272 days.

(21) Appl. No.: 13/003,108

(22) PCT Filed: Jul. 1, 2009

(86) PCT No.: PCT/EP2009/004760
§ 371 (c)(1),
(2), (4) Date: Jan. 7, 2011

(87) PCT Pub. No.: WO2010/003584
PCT Pub. Date: Jan. 14, 2010

(65) Prior Publication Data
US 2011/0125322 A1    May 26, 2011

(30) Foreign Application Priority Data
Jul. 9, 2008    (DE) .......................... 10 2008 032 259

(51) Int. Cl.
*G06F 19/00*    (2011.01)
(52) U.S. Cl.
USPC ........................................... 700/245; 901/50
(58) Field of Classification Search
USPC ...................... 700/245; 901/43, 50
See application file for complete search history.

(56) References Cited

U.S. PATENT DOCUMENTS

| | | | | |
|---|---|---|---|---|
| 4,798,341 A | * | 1/1989 | Gimple | .......................... 239/694 |
| 5,014,644 A | | 5/1991 | Yamamoto et al. | |
| 5,260,009 A | * | 11/1993 | Penn | .............................. 264/401 |
| 5,390,128 A | * | 2/1995 | Ryan et al. | ..................... 700/193 |
| 7,376,488 B2 | * | 5/2008 | Watanabe et al. | ............. 700/264 |
| 2003/0078694 A1 | * | 4/2003 | Watanabe et al. | ............. 700/245 |
| 2005/0044700 A1 | * | 3/2005 | Ghuman et al. | ................. 29/791 |
| 2007/0042123 A1 | * | 2/2007 | Endregaard et al. | ........ 427/421.1 |
| 2008/0142652 A1 | * | 6/2008 | Johnson | ..................... 248/176.1 |
| 2012/0123590 A1 | * | 5/2012 | Halsmer | ....................... 700/264 |

FOREIGN PATENT DOCUMENTS

| | | |
|---|---|---|
| DE | 10150826 A1 | 4/2003 |
| DE | 102005051533 A1 | 8/2006 |
| DE | 60127644 T2 | 7/2007 |
| DE | 102007037865 B3 | 9/2008 |
| DE | 102008027994 B3 | 4/2010 |

(Continued)

OTHER PUBLICATIONS

International Search Report PCT/EP2009/004760 Dated Sep. 25, 2009.

*Primary Examiner* — Khoi Tran
*Assistant Examiner* — Robert Nguyen
(74) *Attorney, Agent, or Firm* — Bejin VanOphem & Bieneman PLC

(57) ABSTRACT

In order to program the sealing membranes to be applied to attachment parts of vehicle bodies, for example to the edge-formed seam of vehicle doors using a robot, an attachment part may be removed from the body and, away from the latter, be mounted on a teach frame where all regions of the attachment part which need to be coated are highly visible to the programmer during programming.

20 Claims, 4 Drawing Sheets

(56) References Cited

FOREIGN PATENT DOCUMENTS

| | | | |
|---|---|---|---|
| EP | 1108478 A2 * | 6/2001 | |
| GB | 2114024 A | 8/1983 | |
| GB | 2114024 A * | 8/1983 | |
| JP | 60095609 A | 5/1985 | |
| JP | 60095609 A * | 5/1985 | |
| WO | WO-91/04522 A1 | 4/1991 | |
| WO | WO 9104522 A1 * | 4/1991 | |

* cited by examiner

METHOD AND SYSTEM FOR APPLYING A COATING MATERIAL USING A PROGRAMMABLE ROBOT

CROSS-REFERENCES TO RELATED APPLICATIONS

This application is a National Stage application which claims the benefit of International Application No. PCT/EP2009/004760 filed Jul. 1, 2009, which claims priority based on German Application No. 10 2008 032 259.8, filed Jul. 9, 2008, both of which are hereby incorporated by reference in their entirety.

BACKGROUND

The present disclosure relates to a method and a system for applying a coating material onto components of work pieces to be processed in series, e.g., in accordance with the preamble of the independent patent claims, for example for the application of a sealing material onto doors, bonnets or other attachment parts of vehicle bodies. In particular, it may be the application of paths to seal areas, such as e.g. flanged folds, of the attachment parts, which are not visible from the outside when the attachment part is in its closed position in or on the work piece.

To increase the degree of automation in the coating of work pieces, such as vehicle bodies, robots are to be increasingly used also for coating operations, which so far could only be performed manually. One example for such processes is the sealing of joints or folds on parts of the body, which are later visible on the finished vehicle by its user and for which high demands are thus placed not only on the sealing function but also on the optical appearance.

In this connection, however, the problem arises that a part of these sealing processes has to be performed on vehicle areas, which are not accessible without any problems. This includes, for example, the sealing of flanged folds on vehicle doors. These folds are on the inner surface of the doors and are to be coated in a serial operation while the doors are closed to avoid the additional effort of opening and closing the door in the course of this. Thus, the programming should also not take place while the door is open. This results in the programming of the application paths being very laborious and difficult as the programmer cannot see the exact position of the application nozzle in relation to the surface area to be coated when tracking the flanged seam invisible on the inner surface of the closed door. It virtually has to be programmed "blindly".

To apply a sealant to a flanged seam of closed doors or other attachment parts of vehicle bodies, various application tools and corresponding methods are generally known.

One possibility to simplify the programming process would be the so-called off-line programming on a computer independent from the robot. In this connection, a movement path of the robot can be generated on the computer on the basis of existing data of the respective vehicle part and the robot cell and can optionally be combined with the required application parameters. These programs can then be transmitted to the robot, which can perform the application after a corresponding initial measurement of the work piece. However, in the application of sealing paths, this procedure has the problem of tolerance chains, for example where the use of the robot and the independent computer result in additions of tolerances for both machines and/or other devices. The additive tolerances may be too large in many cases, and may result in difficulties fulfilling appearance requirements or demands for the optical appearance of the seal joint. In the worst case, undesired collisions between the applicator or the application nozzle and the component to be coated also result. Subsequent teaching of the entire application work flow is then required.

As a result, in practice the programming can currently only be performed iteratively: after a first programming, the application initially takes place by way of trial and the application pattern is examined after opening the attachment part to be coated. It is attempted to draw conclusions from the optical appearance of the application with regard to the parameters to be optimized, which can be both motion parameters of the robot and application parameters. On this basis, corresponding modifications to the application program are made and another application is performed with the component being closed. The next iteration step takes place thereafter. The iteration method is continued until the application is satisfactory. This method is undesirably labour-intensive and time-consuming. This method may be particularly time-consuming and/or labor-intensive where components being coated or worked upon are installed to enclosures, e.g., vehicle bodies, that limit access to the component.

Accordingly, there is a need for an improved method and system, e.g., of the type mentioned at the outset, which, in comparison to the prior art, allow for a substantially simpler and more precise programming of the robot for the coating of component areas, which are not visible from the outside during the normal serial coating process.

BRIEF DESCRIPTION OF THE FIGURES

While the claims are not limited to the specific illustrations described herein, an appreciation of various aspects is best gained through a discussion of various examples thereof. Referring now to the drawings, illustrative examples are shown in detail. Although the drawings represent the exemplary illustrations, the drawings are not necessarily to scale and certain features may be exaggerated to better illustrate and explain an innovative aspect of an illustration. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

DETAILED DESCRIPTION

The exemplary illustrations are generally based on the finding that the programming of the robot for the coating of difficult component areas, such as, for example, the flanged fold of vehicle doors or the like, can be performed substantially faster, simpler and more precise when, in this process, the component is not fitted into the associated work piece, but is disassembled and completely removed from the latter. The exemplary illustration are in particular based on using a teaching or programming framework. This framework can receive the respective attachment part of, for example, a body, which then is freely accessible from all the sides required on the framework, the application nozzle and the surface to be coated being entirely visible for the programmer. Thus, observations and analysis of the corresponding parameters influencing the application quality are also more easily performed, and an optimization of the application may be performed substantially faster and more effective than in the hitherto customary methods.

The on-line programming of the application path on the component to be arranged on the programming framework may be performed in accordance with any teach-in method that is convenient, e.g., in which the programmer directs the robot point by point, or continuously to the desired position using a control panel, merely as examples. Another possibility in the on-line programming would be the so-called playback method in which the programmer tracks the intended application path by directly guiding the application tool.

However, the programming or teaching framework can also be combined in combination with an off-line programming as described above. The application programs generated off-line can advantageously be tracked on the component attached to the teaching framework and can be optimized in the course of this.

In practice, it was found that the programming work can be reduced substantially, and in one exemplary illustration by a factor of 5, with regard to time and cost by using the programming framework and that, in this connection, the application quality of the serial coating is not poorer than before, but is in fact even improved.

The control programs generated in this programming can be transferred just as easily and without any problems to the control of the serial coating of the components fitted into or attached to the associated work pieces.

Figure 1:
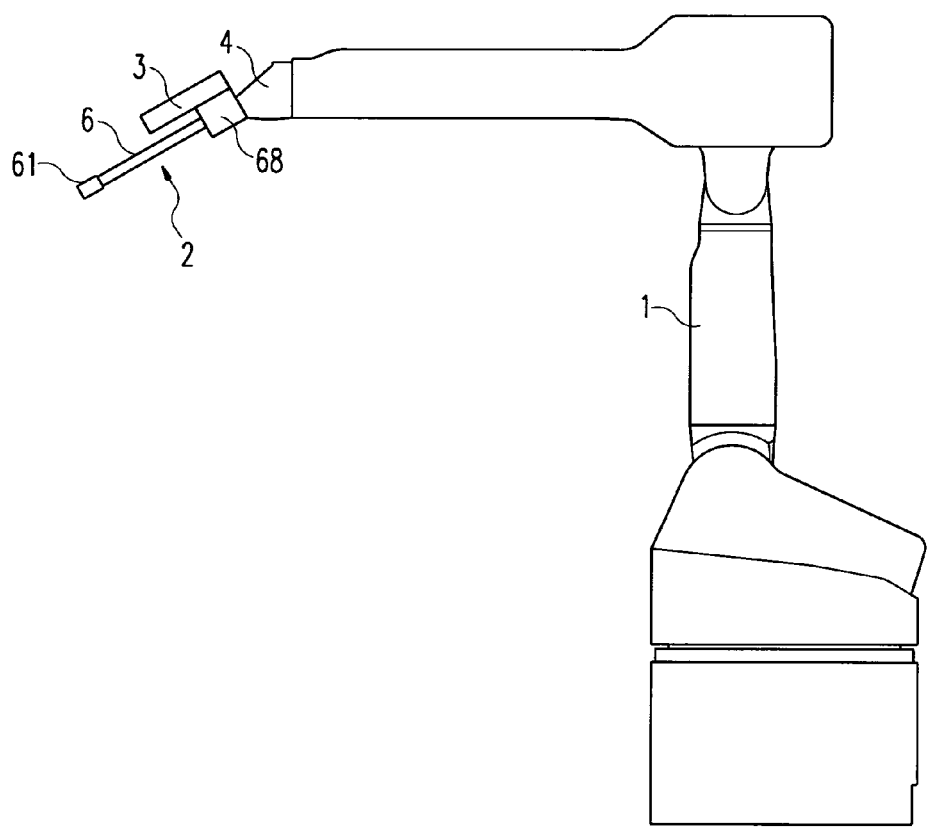
FIG. 1 shows a coating robot suitable for the application of joint sealing material, according to one exemplary illustration.

Referring now to FIG. 1, an exemplary coating robot 1 is schematically illustrated with 6 axes, for example, and bears an applicator 2 on its wrist joint 4 with, in this example, 3 axes, the applicator including the elongated, e.g. tubular lance part 6 typical for applications of sealing material (sealing), the nozzle arrangement 61 with at least one application nozzle being on the outer end of the lance part. In this respect, the robot 1 may be any robot that is convenient.

Figure 2:
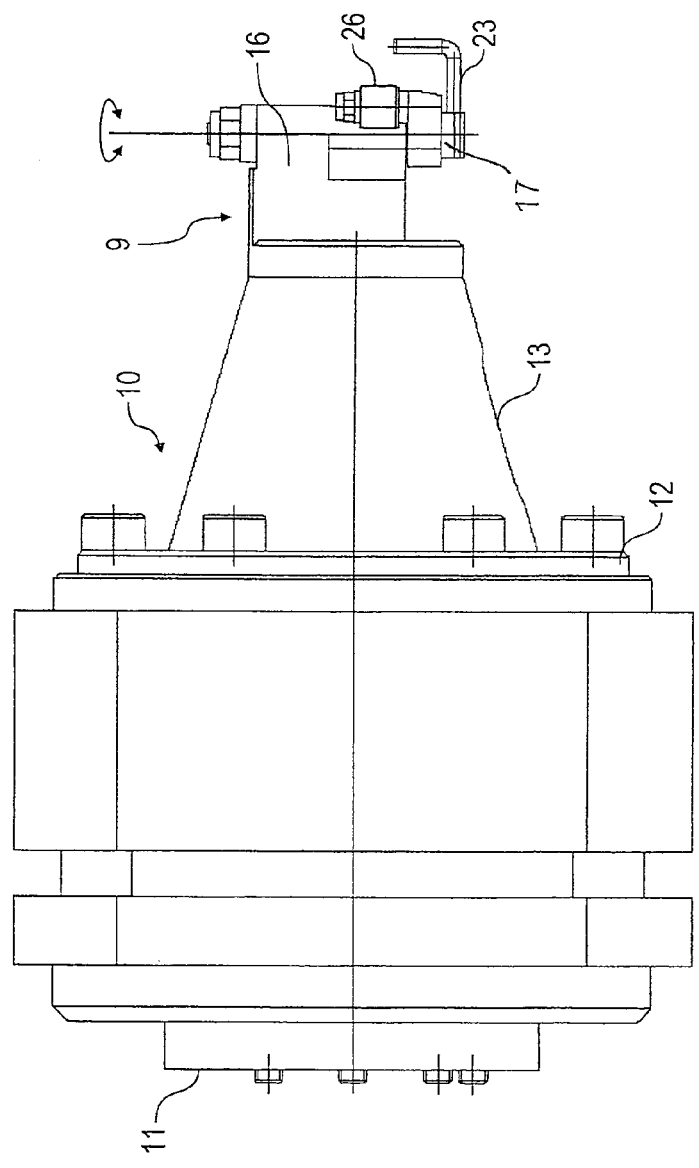
FIG. 2 shows a usable application tool of the robot of FIG. 1.

However, the nozzle arrangement 61 of the applicator 2 can be formed by the application tool 9 illustrated in FIG. 2 with a tolerance compensation device 10, for example as described in DE 10 2007 037 865 B3 and corresponding U.S. Pat. Pub. No. US 2010/0075058, the entire disclosures of each being hereby expressly incorporated by reference in their entireties. Accordingly, the tolerance compensation device 10 may include a flange 11 for mounting to the lance part 6 and another flange 12 to which the application tool 9 is mounted by means of the conical connector 13. The tolerance compensation device 10 permits three-dimensional compensating movements of the mounting flange 12 and thus the complete application tool 9 in relation to the mounting flange 11 on the side of the robot to be able to reduce the demands on the positioning precision of the robot used. The application tool 9 has a material bar 16, which forms a rotatable bearing for a pressure rocker 17 in which two pressure rollers 26 are supported, which can roll off on one front side of the component to be sealed during the serial coating. It is achieved by this roller contact that the nozzle 23 curved perpendicularly according to the illustration is held in a predetermined position on a rear side of the flanged seam to be sealed to be able to apply the sealant in a clean and precise manner.

Figure 3:
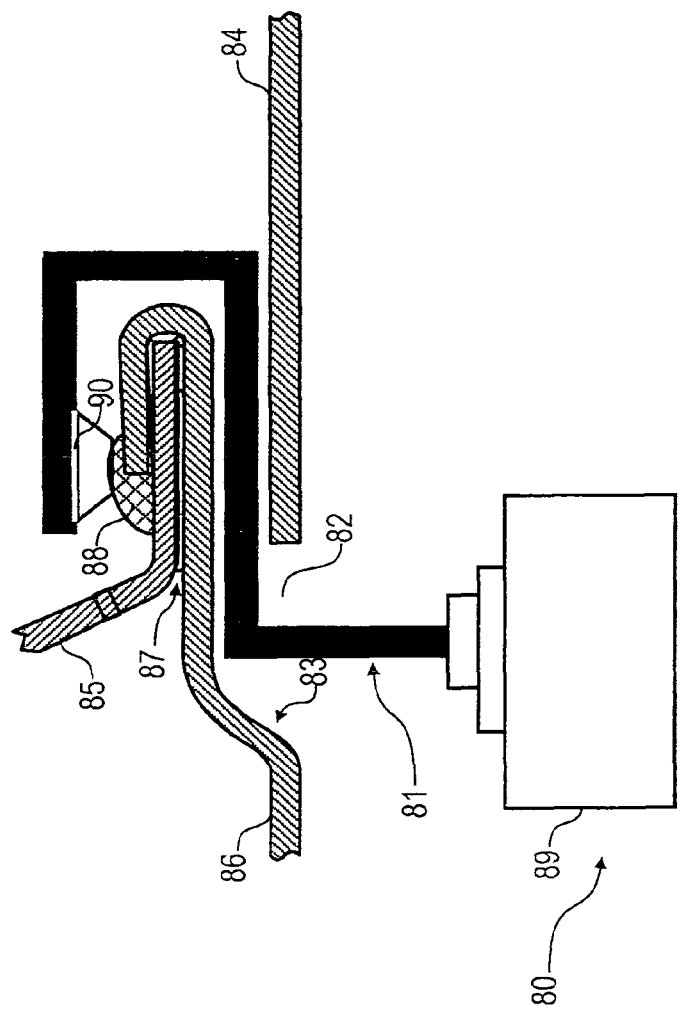
FIG. 3 shows another exemplary application tool for the robot, e.g., of FIG. 1.

The nozzle arrangement 61 of the robot can also be formed by the application tool 80 illustrated in FIG. 3, for example as described in the German patent application DE 10 2008 027 994.3 and corresponding international publication number WO 2009149854A1, which is characterized by a, for example, tubular nozzle holder 81 curved several time, for example, twice according to the illustration into an L shape or an approximate S shape. FIG. 3 shows the area of a gap 82 between a vehicle door 83 and a wing 84, the vehicle door overlapping with the wing in the closed state illustrated in the drawing. The door 83 has an inside panel 85 and a panel planking 86 being crimped around a bent edge of the inside panel. Within the area of the bent edge, the inside panel 85 is connected with the panel planking 86 by an adhesive layer 87. With this construction, the risk exists that moisture enters into the gap between the bent edge of the inside panel and the crimped edge of the panel planking in the area of the flanged seam and causes corrosion. The flanged seam between the inside panel and the panel planking is thus sealed with a sealant 88 extending over the entire length of the flanged seam to prevent moisture penetration into the flanged seam. In this connection, the application of the sealant is performed by the application tool 80, which protrudes through the gap 82 between the vehicle door 83 and the wing 84, as explained in detail in the mentioned patent application. The nozzle holder 81 illustrated generally permits to position the nozzle 90 guided by the nozzle holder through a gap between overlapping components on the rear side of the components to apply coating agent thereto. The application tool 80 has a connection flange 89 for mounting to the robot. The application tool 80 may also be arranged resiliently on a tolerance compensation device, e.g., in accordance with DE 10 2007 037 865 B3 and corresponding U.S. Pat. Pub. No. US 2010/0075058 as noted above.

With such an application tool 9 or 80 of the coating robot 1 used in the serial coating, the programming of the application path for the flanged seam described below can also be performed, but the exemplary illustrations are not limited to these application tools.

Figure 4:
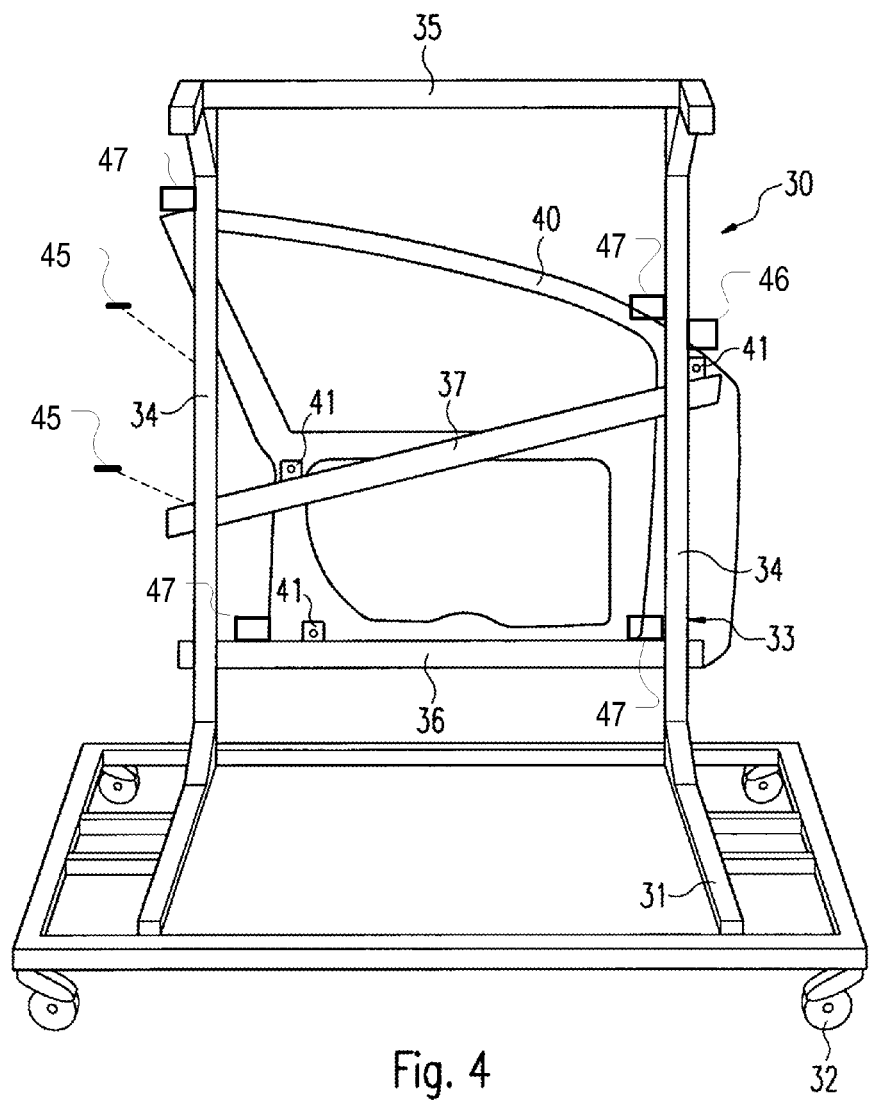
FIG. 4 shows a teaching framework according to one exemplary illustration.

For the programming of the paths to be applied to seal the flanged seam of a vehicle door, for example, the programming or teaching framework more or less schematically illustrated in FIG. 4 may be used. Accordingly, the framework 30 may have a horizontal floor frame 31, which, according to the illustration, can be maneuvered on carriage rollers 32 or on a stable chassis not illustrated and locked with braking devices not illustrated. A vertical supporting structure 33 having vertical supports 34 being spaced apart is mounted on the floor frame 31, the supports at their upper ends being connected by a horizontal cross-bar 35. Furthermore, according to the illustration, the supporting structure 33 can have cross-beams 36 and 37 being arranged at different heights, which serve as moveable mountings for the vehicle door 40. The door 40 is mounted to both the cross-beams 36 and 37 e.g. with threaded rods or other spacers 41 available to the person skilled in the art, adhering to a horizontal distance from the supporting structure 33 sufficient for the intended purpose. The mounting points on the door 40 may, for example, be approximately at points where the door is held in the body or else at other suitable mounting positions of the door.

For setting the position and orientation of the door 40, e.g., according to its fitted position in the body, in the serial coating, and for adjustment to different body and door shapes, the cross-beams 36 and 37 may be continuously adjustable on the supports 34 and/or the threaded rods or spacers 41 may be continuously adjustable on the cross-beams 36, 37. To this end, the supports 34 and/or the cross-beams 36, 37 can be provided with suitable linear guides, slide or roller rails (e.g. HELM rails), C-rails or the like or can be formed correspondingly. To readjust the door position in the vertical plane and/or horizontally in the direction of the threaded rods or other spacers 41, automatically controllable electric or other servo-drive systems 46 can be provided. The position control of these servo drives 46 may take place by means of data, which can be extracted from the CAD data of the respective body. In this connection, stored three-dimensional data can be used, which indicate the holding or mounting points of the attachment part in the work piece, that is, e.g. the hinges of the vehicle door. piece, that is, e.g. the hinges of the vehicle door.

The framework 30 can possess scaling devices, which simplify a reproducible setting of the attached door in the three Cartesian coordinates and the associated three rotation angles.

Furthermore, the framework 30 may have reference markers 45 with which the position and orientation with regard to the robot can initially be measured wherein the sensor device 3 (FIG. 1) attached to the robot may serve as the measurement system. Furthermore, the framework can have quick release fasteners 47 with which fast mounting and demounting of the door is made possible.

The described framework can be modified in any way, among other things, also for adjustment to other attachment parts, but some conditions shall be adhered to for the intended purpose. The framework should thus be constructed in such a way that after attaching the attachment part to the framework, those areas in which the application is to be performed are well visible. With regard to its dimensions, the framework may be constructed in such a way that it can be moved without any difficulties and is can also be transported in a coating unit without any problems, for example. The framework may advantageously have no obstacle contours, e.g., that would hinder an automatic application with the robot, and the application should be possible in the same manner as it is also performed on the body.

To execute the method described herein with the example of a body as the work piece and a vehicle door as the attachment part, the complete body with the closed doors mounted may initially be placed at a point at which the coating robot intended for the serial application of the sealing paths is located. At this point, the concerned door may be initially measured by means of a sensor or measuring device 3 attached to the applicator 2 of the robot 1 (FIG. 1) and moveable by the application tool 9 (FIG. 2) or 80 (FIG. 3), i.e. the exact current position of the door in relation to the body is determined.

Thereafter, the body may be removed from the robot station and the concerned door may be demounted from the body.

Now, the teaching framework may be installed in the robot station in place of the body and the door removed from the body is beforehand or in the robot station positioned in the holders of the teaching framework. The teaching framework may be positioned in front of the robot in such a way that the door is approximately (about +/−10 mm) in the same position and orientation in relation to the robot as the body was before. To this end, the three-dimensional CAD data of the respective body shape usually available in coating units can initially be used with which, in combination with the coordinates of known reference points, the holders for the door can be set correspondingly by means of the drive controls of the teaching framework such that the door is automatically driven into the required programming position or can be positioned in the already correspondingly set holders.

To correct unavoidable tolerances, the door mounted to the teaching framework may be subsequently initially measured by the sensor device of the robot, i.e. its exact current position in relation to the framework is determined. The holders of the teaching framework can be adjusted correspondingly.

The position and orientation of the teaching framework in relation to the robot can also be determined with the sensor device of the robot by means of reference markers of the teaching framework.

Instead of the described readjustment of the holders with servomotors, alternatively, the option also exists to arrange the teaching framework at an auxiliary robot or another manipulator with several axes disposed in the coating robot station, the auxiliary robot or manipulator automatically bringing the teaching framework into the required position in relation to the coating robot, e.g. by controlling it by means of the CAD data of the body.

Now, the programming of the application path to the teaching framework adopting teaching methods customary per se can be performed.

As already mentioned, it can make sense to shorten this method to assume an off-line programming in this case, which was previously performed, for example, with a commercially available simulation program tool on the basis of the existing three-dimensional data model of the body and which can be optimized in fine-tuning operation by the teach-in programming. In the teach-in programming, the nozzle and the door surface area (flanged seam) to be sealed off with the application path are visible at all points and the application performed during the programming can be monitored and analyzed completely and precisely.

The substantial advantages of the exemplary illustrations would also result without prior off-line programming.

After completing the programming, a standard coating can be performed by way of trial. To this end, the door may again be removed from the teaching framework and mounted into the body, which is positioned in the robot station in front of the robot instead of the teaching framework. This first trial coating typically already proves to be satisfactory such that no further adjustment of the application path and/or the application parameters is required.

By means of the control program generated in the described manner, in the course of the serial coating, the flanged folds of the concerned doors in their closed positions are then coated with sealant along the programmed application path using the robot corresponding to FIG. 1 and FIG. 2. In this connection, it may be effective to clean the nozzle of the application tool in each case prior to the application, suitable methods (also referred to as purges) being known for this purpose.

The method described above can be more generally performed in the same manner for any other work pieces and attachment parts for the application of any other paths and coating substances.

The invention is not limited to the preferred exemplary embodiments described above. Rather, a multiplicity of variants and modifications are possible, which likewise make use of the inventive idea and therefore fall within the protective scope. Exemplary illustrations are not limited to the specific examples illustrated above. Rather, a plurality of variations and alterations are possible that also make use of the ideas described herein, and therefore fall within the scope of protection. Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be evident upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "the," etc. should be read to recite one or more of the indicated elements unless a claim recites an explicit limitation to the contrary.

The invention claimed is:

1. A method for applying a coating material onto components of work pieces to be processed in series using a programmable coating robot with several axes, comprising:
    programming at least one application path to be taken by the coating robot to generate the control program to be executed by the coating robot in the serial coating of the components of the work piece, an application tool being moved along the application path on a sample component of the work piece as if the sample component were assembled with at least one other component to form the work piece, the sample component corresponding to the components to be coated in series when part of the work piece, and
    coating the components of the work piece automatically, wherein the coating robot is controlled by the control program,
    wherein the sample component is removed from the work piece and mounted on a programming framework prior to the programming so that the application tool is moved on the sample component without the work piece during the programming.

2. The method according to claim 1, wherein areas of the components are coated, which are not visible from an outside area with respect to at least one predetermined position of the component on the work piece.

3. The method according to claim 1, wherein:
    the application tool is moved on the component mounted thereon such that all the areas of the component to be coated in accordance with the programming are visible for a programmer.

4. The method according to claim 1, wherein the programming framework is moveable and is positioned at a location of the components are coating in series.

5. The method according to claim 1, wherein the application tool is moved on the sample component by the robot used in the serial coating during the programming.

6. The method according to claim 1, wherein the sample component is arranged during the programming at least approximately in a position and orientation in which the components are in or on the work piece during the serial coating.

7. The method according to claim 1, wherein, prior to the programming being executed on the programming framework, the work piece is measured with a measuring device fixed to the application tool to determine the position of the component to be coated in relation to the work piece and/or the component disposed on the programming framework is measured with the measuring device to determine a position of the component in relation to the framework, and the respective measurement data is stored.

8. The method according to claim 1, wherein the programming is performed in accordance with a teach-in method.

9. The method according to claim 1, wherein the programming is performed in accordance with a playback method.

10. The method according to claim 1, wherein the coating material to be applied is a sealing material.

11. The method according to claim 1, wherein the components to be coated are selected from a group consisting of doors, lids and other attachment parts of vehicle bodies.

12. The method according to claim 1, wherein:
    an off-line programming of the application path is performed prior to the on-line programming movement of the application tool; and
    the on-line program is used to optimize the off-line program.

13. A coating system for applying a coating material onto components of work pieces to be processed in series using a programmable coating robot with several axes, the system comprising:
    an application tool configured to move along an application path on a sample component as if the sample component were assembled with at least one other component to form the work piece, the sample component corresponding to components to be automatically coated in series by the coating robot when part of the work piece; and
    wherein the sample component is removed from the work piece and mounted on a programming framework prior to programming the coating robot so that the application tool is moved on the sample component without the work piece during the programming.

14. The coating system according to claim 13, further comprising a measuring device moveable with the application tool, the measuring device arranged at the coating robot during the programming.

15. The coating system according to claim 13, wherein the programming framework includes moveable holders for the sample component.

16. The coating system according to claim 13, wherein a servo-drive system continuously sets the position and/or orientation of the component mounted at the framework in relation to the framework and/or to continuously readjust the holders for the adjustment to different sample components.

17. The coating system according to claim 13, wherein drives of the programming framework are configured to be controlled automatically by means of a stored computer-aided design data of the respective work piece and/or by means of a stored three-dimensional data of the position of holding or mounting points of the component in the work piece.

18. The coating system according to claim 13, wherein the programming framework includes quick release fasteners.

19. The coating system according to claim 14, wherein the programming framework includes reference markers with which the measuring device of the robot determines the position and/or orientation of the framework in relation to the robot.

20. The coating system according to claim 16, wherein the servo-drive system includes automatically controlled drives.

* * * * *